United States Patent
Csuros et al.

[15] 3,691,103
[45] Sept. 12, 1972

[54] PROCESS FOR THE PREPARATION OF A NON-PYROPHORIC NICKEL SKELETON CATALYST

[72] Inventors: Zoltan Csuros; Jozsef Petro; Antal Tungler; Tibor Mathe; Sandor Bekassy, all of Budapest, Hungary

[73] Assignee: Magyar Tudomanyos Akademia

[22] Filed: March 26, 1970

[21] Appl. No.: 23,068

[30] Foreign Application Priority Data

March 25, 1969 Hungary..................MA 1965

[52] U.S. Cl................................252/473, 252/477 Q
[51] Int. Cl. ...............................................B01j 11/22
[58] Field of Search ...................252/477, 473; 75/96

[56] References Cited

UNITED STATES PATENTS

| | | | |
|---|---|---|---|
| 2,417,041 | 3/1947 | Ayers | 196/30 |
| 2,677,668 | 5/1954 | Ahlberg | 252/472 |
| 324,505 | 8/1885 | Walton | 75/96 X |
| 2,602,871 | 7/1952 | Noland | 219/10 |
| 2,092,595 | 9/1937 | Spowers | 75/96 |
| 1,898,969 | 2/1933 | Barstow | 75/96 X |
| 1,628,190 | 5/1927 | Raney | 252/477 Q X |
| 2,421,416 | 6/1947 | Flexser | 260/635 |

Primary Examiner—Daniel E. Wyman
Assistant Examiner—Philip M. French
Attorney—Young & Thompson

[57] ABSTRACT

A process for the preparation of non-pyrophoric nickel skeleton catalysts, in which 30 to 80 percent by weight of metallic zinc, 60 to 20 percent by weight of metallic nickel and 0 to 40 percent by weight of one or more further metals soluble in alkaline solutions are heat-treated at temperatures in the range of 880° to 1,120° C for at least 3 minutes, preferably for 10 to 30 minutes, with simultaneous protection of the surface of the melt against oxidation, the melt thus obtained is cooled at a rate not exceeding 120°/minute in the average, the alloy thus obtained is powdered or granulated, and the powdered or granulated alloy is treated with an alkali hydroxide solution of 10 – 50 percent by weight at temperatures not exceeding the boiling point of the alkaline solution.

3 Claims, No Drawings

PROCESS FOR THE PREPARATION OF A NON-PYROPHORIC NICKEL SKELETON CATALYST

The invention relates to a process for the preparation of a non-pyrophoric nickel skeleton catalyst.

It is known that the so-called skeleton catalysts are produced from alloys of a catalytically active metal, e.g., nickel, cobalt, copper etc., with an inactive metal, mostly aluminum, in some cases silicon, with removal of the inactive component by dissolution. Owing to their high activity, such catalysts are widely employed both in the industry and in research, mainly in hydrating-dehydrating reactions.

It is a serious drawback of the known skeleton catalysts that they are pyrophoric, and thereby involve a considerable fire risk, which is increased to explosion risk in the presence of hydrogen. Accordingly, the use of these catalysts demands extreme caution in each step of the catalytic process, i.e., when introducing the catalyst, opening and de-aerating the apparatus, filtering the catalyst off the reaction mixture, but even so accidents involving serious injuries occur quite often.

At present non-pyrophoric skeleton catalysts of an activity commensurable to that of pyrophoric skeleton catalysts and of not substantially higher price are not known.

The most widely used skeleton catalyst is the so-called Raney nickel, prepared from an alloy containing abt. 50 percent by weight of aluminum and abt. 50 percent by weight of nickel, by dissolving the aluminum by means of an alkaline solution. This type of catalyst is highly active already at room temperature, but extremely pyrophoric.

In the patents relating to skeleton catalysts, such as U.S. Pat. Nos. 1,563,787 (1925) 1,628,191, (1927) and 1,915,473 (1933), Raney mentions in addition to aluminum, also silicon, zinc and magnesium as dissoluble components owing to their solubility in alkaline solutions. In practice, however, catalysts have only been made from aluminum-containing alloys, whereas the potential use of other metals for this purpose was considered only a theoretical possibility.

Zinc-nickel alloys have not been employed for preparing skeleton catalysts. Shuykin et al. have prepared carrier-type catalysts from a zinc-nickel alloy, not readily decomposable by alkalis, which was used for hydrating furane derivatives, but the activity of said catalyst was negligibly low even at 300° C.

It is the object of the present invention to provide a method by which non-pyrophoric skeleton catalysts can be produced.

It has been surprisingly found that this object can be achieved, i.e., that it is possible to prepare non-pyrophoric skeleton catalysts from nickel-zinc-containing alloys. This recognition is unexpected because according to the concensus of opinion of those skilled in the art, nickel skeleton catalysts are pyrophoric.

It has furthermore been found that a non-pyrophoric skeleton catalyst of appropriate activity may be prepared from a zinc-containing nickel alloy, if the melt of the alloy, is cooled at an average rate of not more than 120° C/min.

Finally it has been established that skeleton catalysts produced in the above disclosed manner may be stored in air after drying, in the form of a dry powder, without any diminution of their activity.

The invention relates to a process for the preparation of non-pyrophoric nickel skeleton catalysts, wherein 30 to 80 percent by weight of metallic zinc, 60 to 20 percent by weight of metallic nickel and 0 to 40 percent by weight of one or more further metals soluble in alkaline solutions are heat-treated at temperatures in the range of 880° to 1,120° C, preferably 940° to 980° C, for at lease 3 minutes, preferably for 10 to 30 minutes, with simultaneous protection of the surface of the melt against oxidation, the melt thus obtained is cooled at a rate not exceeding 120° C/minute in the average, the alloy thus obtained is powdered or granulated, and the powdered or granulated alloy is treated with an alkali hydroxide solution of 10 – 50 percent by weight, preferably 20 – 30 percent by weight, at temperatures not exceeding the boiling point of the alkaline solution, and if desired, the catalyst so obtained is dried in air or in an inert gas atmosphere, while keeping the temperature of the powder below 60° C.

When proceeding in conformity with the process according to the invention, a skeleton catalyst is obtained which, in addition to exhibiting the advantageous properties of skeleton catalysts prepared from the conventional nickel-aluminum alloys, has the further outstanding advantage of being non-pyrophoric, that is, ready to be used without any special precautionary steps.

When a dry powder is prepared, it is advisable to activate the catalyst prior to use by treating it with a solution of ammonium hydroxide.

The alkali treatment is preferably performed for 5 to 30 minutes at the boiling point of the alkaline solution and for 20 to 50 minutes at 50° C.

Aluminum, silicon and/or magnesium are preferably employed as further metals soluble in alkaline solutions.

While alloying the surface of the melt can be protected with a carbonaceous substance freed from volatile components, e.g., by charcoal, or with a rare gas atmosphere, preferably an argon or helium atmosphere.

The process according to the invention is preferably carried out by heating a melt containing 50– 70 percent by weight of metallic zinc and 50 – 30 percent by weight of metallic nickel, covered with a charcoal layer of 4 to 5 cm thickness, in 10 to 20 minutes to 930° – 950° C. Thereafter the melt is cooled at a rate of 20° to 40° C in the average. The alloy is pulverized to a particle size not exceeding 60 $\mu$ diameter, whereafter 25 to 35 percent by weight of the zinc content is dissolved out by treating the powder thus obtained for 25 to 30 minutes with a 20 – 30 percent by weight sodium hydroxide solution at a temperature of 60° – 80° C. The product is decanted and washed until neutral.

Some of the main advantages to be achieved by means of the process and catalyst, resp., according to the invention are as follows:

a. The catalyst is non-pyrophoric and accordingly can be handled without the risk of accidents, fire or explosion, in contrast to conventional nickel-aluminum skeleton catalysts.

b. The catalyst exhibits excellent catalytic properties in hydration-dehydration reactions carried out both in liquid phase and in gaseous phase.

c. In certain processes the activity and selectivity of the catalyst surpasses that of conventional Raney nickel catalysts.

d. The catalyst can be produced from the alloy in a short time (10 to 40 minutes), whereas the preparation of a Raney nickel catalyst requires 120 to 180 minutes.

e. The reaction of the zinc component with the alkaline solution is only slightly exothermic, with a moderate amount of foam formation for only 1 to 2 minutes; hence, the preparation of the catalyst is easier to control and can be carried out with simpler equipment than when aluminum-nickel alloys are being used.

f. The specific weight of the catalyst is about 2.5, i.e., substantially higher than that of Raney nickel (appr. 1.5), so that sedimentation is quicker and the catalyst is easily filtered off; accordingly, in industrial uses, the catalyst can be readily removed from the reaction mixture.

g. Catalysts apt to be stored in air dry state may also be prepared by means of the process. Such dry catalysts can be stored conveniently, over long periods of time; their transportation and packaging is likewise cheaper and simpler than with wet skeleton catalysts. Another important advantage is that the catalyst amount to be added to the reaction mixture may be determined simply by weighing. On a laboratory scale this improves the precision of the process, whereas on an industrial scale the process is rendered more economic and efficient.

The process according to the invention will be more clearly understood from the following specific examples:

EXAMPLE 1

400 grams of granulated zinc were heated to 500° C in an induction furnace in a cylindrical graphite crucible having a diameter of 8 cm, whereafter 600 grams of nickel were added to the zinc melt. The melt was then covered with lumps of charcoal in a thickness of 5 cm. The temperature of the furnace was raised in 5 minutes to 960° – 980° C and kept constant during further 5 minutes. The crucible was then cooled at a rate of 60° to 80° C/minute.

The alloy so obtained was powdered with an air hammer in a mortar consisting of Si-Mn steel. From the powder so obtained a portion of 50 grams consisting of granules having diameters in the range of 10 to 60 $\mu$, separated by screen analysis, was added to 200 ml of a 30 percent by weight sodium hydroxide solution heated to 90° C. The mixture was stirred for 12 minutes at this temperature, thereafter the solid phase was allowed to settle and the mixture replenished by adding 200 ml of a fresh sodium hydroxide solution of like concentration, having a temperature of 20° to 30° C. After stirring for 5 minutes, the solid phase was allowed to settle, the alkaline solution was decanted, and the greyish-black powder thus obtained was washed until neutral with distilled water.

The catalyst powder so obtained was active already at room temperature when used in the liquid-phase hydration of compounds having various functional groups.

The catalyst moistened with water or alcohol dried in air without spontaneous ignition and without any deterioration of activity. The heating of the catalyst during its drying in air was tested by charging 150 grams of fresh catalyst in a well-insulated open thermos flask; the temperature of the sample was taken for 3 weeks running by means of a platinum resistance thermometer, and was continuously recorded. During this period the catalyst dried completely without any increase in temperature, which means that the catalyst was not pyrophoric.

EXAMPLE 2

One proceeded as in Example 1, with the difference that the starting alloy consisted of 800 grams of zinc and 200 grams of nickel.

The catalyst obtained from this alloy by means of a 10 percent by weight alkaline solution was non-pyrophoric, and could be used to good advantage in hydration-dehydration reactions.

EXAMPLE 3

The alloy powder was produced as described in Example 1, and 25 grams thereof were added with stirring to 100 ml of a 45 percent by weight sodium hydroxide solution heated to 50° C. The mixture was then stirred for 20 minutes at the same temperature. The solid phase was allowed to settle, the solution was decanted and the catalyst powder was washed until neutral. The product was non-pyrophoric and could be well used for hydration purposes.

EXAMPLE 4

The alloy powder was prepared as described in Example 1, starting from 650 grams of zinc and 350 grams of nickel. The zinc was removed in the following manner:

Fifty of the alloy powder were added to 200 ml of a 25 percent by weight sodium hydroxide solution heated to 90° C, whereafter the alkaline solution was kept boiling for 15 minutes with vigorous stirring. After decanting, a fresh charge of 200 ml of a 25 percent by weight alkaline solution was poured onto the powder; the stirring was continued for 10 minutes at a temperature of 60° C. The solution was decanted and the catalyst powder washed to neutral.

The catalyst so obtained was non-pyrophoric and was excellently suitable for use in hydration-dehydration reactions.

EXAMPLE 5

One proceeded as in Example 1, with the difference, however, that the cooled alloy was disintegrated to granules having a diameter of a few millimeters, and that the solution was not stirred during the removal step.

The active hydrating-dehydrating catalyst thus prepared could be readily employed mainly in gas-phase reactions.

EXAMPLE 6

The starting alloy was prepared and powdered in the way as described in Example 1. Two hundred grams of the powder fraction having a particle size of 50 to 60 $\mu$, obtained by screen analysis, were added to 800 ml of a 20 percent by weight sodium hydroxide solution heated to 48° to 50° C. The suspension thus obtained was stirred for a further 15 to 20 minutes, then the solid phase was allowed to settle, the alkaline solution was decanted and the residual black powder was washed with water until neutral. The neutral washing water was decanted and the powder was spread out to dry in air.

The powder so obtained was activated prior to use by means 5 to 10 ml program of a 5 to 15 percent by weight ammonium hydroxide solution for 5 to 30 minutes at 20° to 90° C. After decanting the ammonia solution and washing to neutral, the catalyst was ready to be used.

The catalyst thus obtained was also non-pyrophoric and proved to be active in hydration reactions even at room temperature.

EXAMPLE 7

One proceeded as described in Example 6, with the difference, however, that after decanting the neutral washing water the powder was filtered in an inert gas atmosphere. The wet powder was cooled and contacted with air, while keeping its temperature below 60° C. Heat development ceased after a few minutes standing in the air, and the powder when spread out could be dried without further cooling.

The product so obtained was likewise non-pyrophoric, and could be readily used in special hydrating reactions, requiring a catalyst of high purity.

EXAMPLE 8

One proceeded as described in Example 6, with the difference, however that after setting the powder to neutral by washing and decanting the washing water, 100 ml of a 2 to 10 percent by weight aqueous glycerine solution was poured onto the powder. The mixture was stirred for 10 to 15 minutes at room temperature, and the suspension was allowed to stand overnight. The catalyst was then separated by filtering in a hydrogen atmosphere. The wet powder so obtained was processed as described in Example 7.

The catalyst thus obtained was also non-pyrophoric and could be stored for a long period of time without diminution of activity.

What we claim is:

1. A process for the preparation of non-pyrophoric nickel skeleton catalysts, comprising heating a mixture consisting essentially of 30 percent to 80 percent by weight of metallic zinc and 20 percent to 60 percent by weight of metallic nickel at a temperature in the range of 880° to 1,120° C., in a container for at least 3 minutes, simultaneously protecting the surface of the melt against oxidation, cooling the container at a rate not exceeding 60° to 80° C. per minute, comminuting the alloy thus obtained, and contacting the comminuted alloy with an aqueous solution of alkali hydroxide having a concentration of 10 to 50 percent by weight in an amount and for a time sufficient to dissolve a substantial proportion of the zinc content of the comminuted alloy.

2. A process as claimed in claim 1, said temperature being 940° to 980° C.

3. A process as claimed in claim 1, said heating being conducted for 10 to 30 minutes.

* * * * *